W. STARLEY.
WHEEL FOR VEHICLES.
APPLICATION FILED MAY 25, 1914.
1,169,364.
Patented Jan. 25, 1916.
2 SHEETS—SHEET 1.
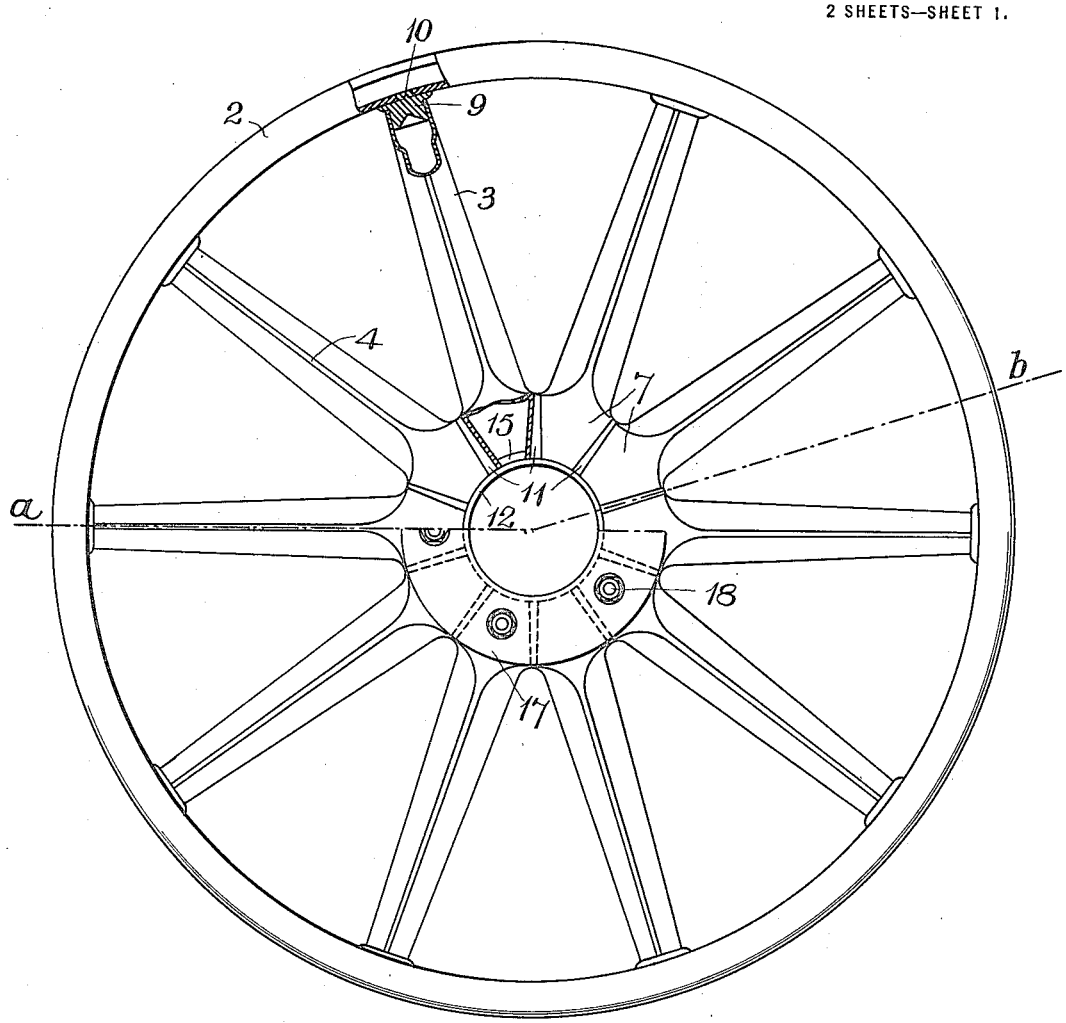
Fig:1.
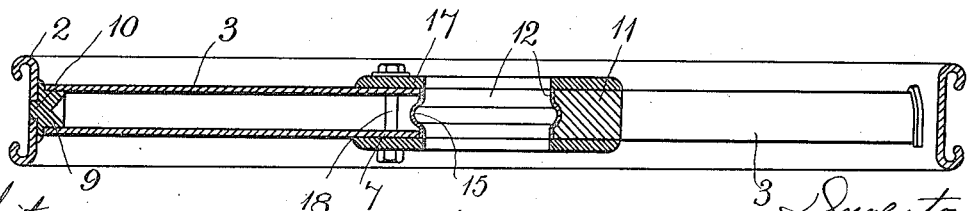
Fig:2.

W. STARLEY.
WHEEL FOR VEHICLES.
APPLICATION FILED MAY 25, 1914.

1,169,364.

Patented Jan. 25, 1916.
2 SHEETS—SHEET 2.

UNITED STATES PATENT OFFICE.

WILLIAM STARLEY, OF COVENTRY, ENGLAND.

WHEEL FOR VEHICLES.

1,169,364.        Specification of Letters Patent.      Patented Jan. 25, 1916.

Application filed May 25, 1914. Serial No. 840,832.

*To all whom it may concern:*

Be it known that I, WILLIAM STARLEY, a citizen of Great Britain, residing at Coventry, in the county of Warwick, England, have invented new and useful Improvements in Wheels for Vehicles, of which the following is a specification.

This invention has reference to wheels for vehicles and more particularly to those of the built-up all metal artillery type adapted to carry pneumatic tires.

The object of the invention is to provide a new or improved method of construction whereby such wheels may be produced in a light, true and strong form and at a low cost.

The invention consists essentially in the construction and arrangement of the spokes and in the method employed in locking the same firmly in the wheel.

In order that the invention may be clearly understood and readily carried into practical effect reference is made in describing the same to the accompanying drawings, wherein—

Figure 3:
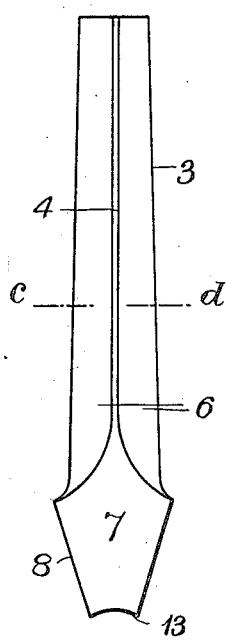
Figure 4:
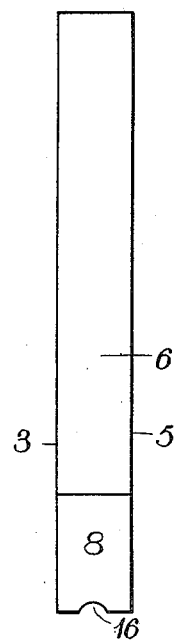
Figure 5:
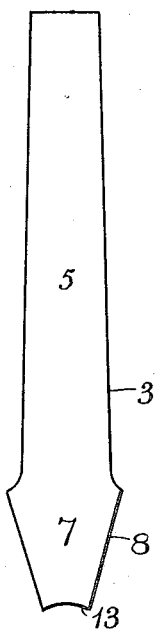
Figure 6:
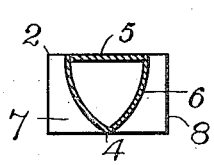
Figure 7:
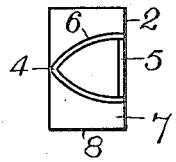
Figure 8:
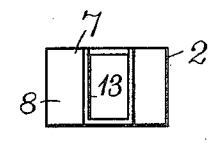
Figures 9, 10:
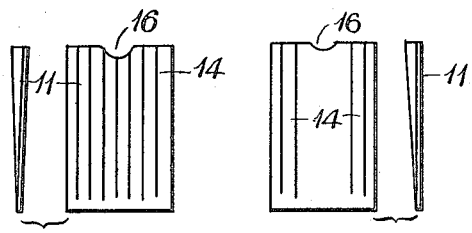
Figure 11:
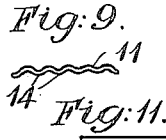
Figure 12:
Figure 13:
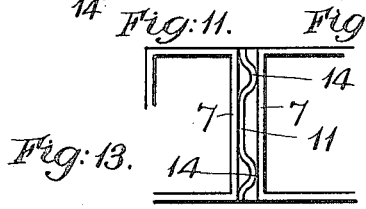

Figure 1 is a side elevation of a wheel constructed according to this invention, part of the front nave plate being removed to disclose more clearly the inner ends of the spokes. Fig. 2 is a transverse sectional view of the wheel taken on the line *a—b* of Fig. 1. Figs. 3, 4 and 5 are front, side and back views respectively of one of the spokes. Fig. 6 is a sectional view of the spoke on line *c—d* of Fig. 3. Figs. 7 and 8 are top and bottom plan views respectively of the spoke as shown in Figs. 4 and 5. Figs. 9 and 10 are composite views of two forms of wedges and each include a face view, and an edge view. Figs. 11 and 12 are plan views respectively of the wedges shown in Figs. 9 and 10. Fig. 13 is a view representing in plan one of the wedges shown in Figs. 10 and 12 in position between the hollow inner ends of two adjacent spokes.

Throughout the drawings like parts are designated by similar reference characters.

As already stated the wheel is of the built-up type having hollow metal spokes which are made separately from the rim and have enlarged inner ends which when the spokes are assembled to form the wheel are locked together and constitute the hub portion of the wheel.

Referring to the drawings, the rim 2, may be of any standard type adapted to carry pneumatic or other suitable tires. The spokes 3 are of tubular form and of any suitable cross section, a preferred section being approximately triangular, as clearly shown in Figs. 3, 6 and 7, in which case they are preferably arranged in the wheel with the apex 4 of the triangle toward the front face of the wheel, see Fig. 1. Each spoke is pressed from sheet metal to the required shape and when made in one piece may have a longitudinal seam down the middle of the base 5 of the triangle which forms the back of the spoke. This seam or joint would be suitably welded. It is however in practice found more satisfactory to make each spoke in two parts one of which is pressed to V-section while the other part is a flat plate which when welded onto the open side of the V-section portion forms the base of the triangle and the back of the spoke. In either case the sides 6 of the triangle are of slightly convex curvature the apex 4 being also rounded off as shown.

In pressing the spokes to the required cross section the dies are formed to give the inner ends 7 of the hollow spokes a wedge shape, the sides 8 of the hollow-box-like wedge when the wheel is built up being approximately radial. The outer ends of the spokes are mounted in the rim by means of pressed or stamped metal plugs 9 around which the open outer ends of the spokes fit with a flush joint. The plugs are each formed with a short stem 10 adapted to engage a hole in the bed of the rim, the free end of the stem being spun over or brazed in the rim, see Figs. 1 and 2. The joint between the plugs and spokes may or may not require brazing.

The locking of the spokes to secure them firmly in the wheel is effected, according to this invention, by means of thin metal wedges 11 driven in between the adjacent faces of the wedge-shaped inner ends 7 of the spokes and retained in position by means of a cylindrical metal liner or shell 12 forced into the open center of the wheel formed by the suitably shaped inner extremities 13 of the spokes as clearly represented in Fig. 1.

The manner in which the wedges are driven in between the inner ends of the spokes is important if the best results are to be obtained. The preferred way is to drive the wedges in a direction radiating from the center of the wheel in which case a double wedge action between the wedges 11 and the reverse wedge-shaped inner ends 7 of the spokes is obtained and at the same time the tendency of the operation is to force the spokes not only into a compact whole at the inner ends but also radially into close contact with the plugs 9 in the rim at their outer ends.

The wedges themselves may be plain or as represented in Figs. 9 and 11 may each consist of a piece of corrugated or fluted metal in which the corrugations or flutes 14 are of a maximum depth at one end of the wedge and gradually merge into the flat at the other end of the wedge. By this means a wedge is provided having, a more or less pronounced spring action, the corrugations or flutes 14 tending to become flattened under pressure and providing a series of narrow bearing surfaces which when the wedge is driven home between a pair of spokes will bite and bed into the walls of the hollow ends of the spokes and also at the same time accommodate themselves to any inequalities that may be present in the adjacent faces of the said inner ends of the spokes, see Fig. 13. Any suitable and well known process of manufacture may be employed for producing these wedges. According to a preferred method the wedges are made from strip steel of uniform section and the graduated corrugations are formed transversely at regular intervals therein by passing the strip with a stepped feed through a press furnished with dies that will corrugate the strip transversely and in such a manner that the corrugations will be at their maximum depth at one edge of the strip and gradually merge into the flat at the other edge of the strip. The strip is then cut up transversely into suitable lengths to form the required wedges. Instead of corrugating the whole width of the wedge as shown in Figs. 9 and 11 each wedge may be formed with one or more corrugations 14 at its marginal edges as represented in Figs. 10 and 12 so as to make contact with those parts of the faces of the spokes giving the greatest resistance to buckling as shown in Fig. 13.

The liner or shell may remain a plain metal cylinder, but according to the preferred construction this central metal liner or shell, after being placed in position at the inner extremities of the spokes is increased in diameter intermediate of its own ends. This is done by working its metal outward radially by a metal spinning or analogous operation. Thus it has intermediate of its own ends an enlargement 15 or enlargements as clearly shown in Fig. 2. The inner extremities of the spokes and of the wedges between them are preferably notched or recessed at 16 to receive the enlargement see Figs. 4, 9 and 10. The liner or shell constitutes by reason of the enlargement 15 a locking device to prevent the spoke ends from shifting along the length of the shell, and conversely to prevent the shell from shifting lengthwise out of the wheel. Moreover, the expanding of the liner or shell enables it to maintain a pressure outward from the wheel center against the inner ends of the spokes or against the inner ends of the wedges placed between them and thus constitutes a keying device.

The center of the wheel is preferably strengthened and finished by the application of annular plates 17 at each side, see Figs. 1 and 2, these plates being secured by bolts 18 passing through the said plates and through the inner ends of the spokes.

What I claim and desire to secure by Letters Patent of the United States is:—

1. In a wheel of the character described, the combination of a rim, a plurality of metal spokes secured thereto and having free wedge-shaped inner ends, a series of metal wedges forcibly driven into permanently tight positions between said inner ends of the spokes in a direction radiating from the center of the wheel, and a plain cylindrical metal liner forced into a permanently tight position within the open center of the wheel formed by the free inner extremities of the spokes and wedges substantially as described.

2. In a wheel of the character described, the combination of a rim, a plurality of hollow metal spokes secured thereto and having free wedge-shaped inner ends, notches formed in said inner ends of said spokes, a series of metal wedges forcibly driven into permanently tight positions between said inner ends of said spokes in a direction radiating from the center of the wheel, notches in said inner ends of said wedges, and a plain cylindrical metal liner forced into a permanently tight position within the open center of the wheel formed by the notched inner extremities of said spokes and wedges, said liner being subsequently expanded intermediate of its inner ends into engagement with said notches in the inner ends of the spokes and wedges, substantially as described.

3. In a wheel of the character described, the combination of a rim, a plurality of metal spokes secured thereto and having free wedge-shaped inner ends, a series of longitudinally corrugated metal wedges forcibly driven into permanently tight positions between said inner ends of the spokes in a direction radiating from the center of the wheel, and a plain cylindrical metal liner forced into a permanently tight position within the open center of the wheel formed by the free inner extremities of the spokes and wedges, substantially as described.

4. In a wheel of the character described, the combination of a rim, a plurality of hollow spokes secured thereto and having free wedge-shaped inner ends, notches formed in said inner ends of said spokes, a series of metal wedges forcibly driven into permanently tight positions between said inner ends of said spokes in a direction radiating from the center of the wheel, said wedges each comprising a piece of metal corrugated so as to gradually increase the effective thickness of the piece of metal toward one end, notches formed in the inner ends of said wedges, and a plain cylindrical metal liner forced into a permanently tight position within the open center of the wheel formed by the inner extremities of the spokes and wedges, said liner being subsequently expanded intermediate of its ends into engagement with said notches in the inner ends of the spokes and wedges, substantially as described.

In testimony whereof I have signed my name to this specification in the presence of two subscribing witnesses.

WILLIAM STARLEY.

Witnesses:
KATHLEEN M. THOMPSON,
ERNEST HARKER.